(12) United States Patent
Jones et al.

(10) Patent No.: US 8,974,157 B2
(45) Date of Patent: Mar. 10, 2015

(54) TRUNK, CARGO AREA, AND TRUCK BED STORAGE PRESS

(71) Applicant: GM Global Technology Operations LLC, Detroit, MI (US)

(72) Inventors: Thomas A. Jones, Macom, MI (US); Raymond A. Beaufait, Macomb, MI (US); Timothy Saunders, Warren, MI (US); Erik Rasmussen, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/645,545

(22) Filed: Oct. 5, 2012

(65) Prior Publication Data

US 2014/0097634 A1    Apr. 10, 2014

(51) Int. Cl.
    *B60P 7/08*    (2006.01)
(52) U.S. Cl.
    USPC .......................................................... 410/34
(58) Field of Classification Search
    USPC ............. 410/34, 38, 117, 118, 127, 128, 129, 410/130, 135
    See application file for complete search history.

(56) References Cited

U.S. PATENT DOCUMENTS

| | | | | |
|---|---|---|---|---|
| 1,499,229 A * | 6/1924 | Laffey | ................ | 410/129 |
| 2,388,304 A * | 11/1945 | Ackerman et al. | .............. | 410/46 |
| 2,726,776 A * | 12/1955 | Myers | .............. | 414/513 |
| 3,211,308 A * | 10/1965 | Glass | .............. | 414/516 |
| 3,837,508 A * | 9/1974 | Stefanelli | .............. | 414/510 |
| 4,049,311 A * | 9/1977 | Dietrich et al. | .............. | 410/138 |
| 4,078,682 A * | 3/1978 | Johnson, Jr. | .............. | 414/525.6 |
| 4,199,297 A * | 4/1980 | Abolins | .............. | 414/525.6 |
| 4,273,485 A * | 6/1981 | Fischer et al. | .............. | 410/34 |
| 4,278,376 A * | 7/1981 | Hunter | .............. | 410/130 |
| 4,359,307 A * | 11/1982 | Johnson, Jr. | .............. | 414/525.6 |
| 4,360,298 A * | 11/1982 | Fischer et al. | .............. | 410/32 |
| 4,955,771 A * | 9/1990 | Bott | .............. | 410/104 |
| 5,167,479 A * | 12/1992 | Bott | .............. | 410/121 |
| 5,193,453 A * | 3/1993 | Lundy | .............. | 100/100 |
| 5,201,481 A * | 4/1993 | Hararat-Tehrani | .............. | 244/118.1 |
| 6,099,220 A * | 8/2000 | Poth | .............. | 410/94 |
| 6,270,299 B1 * | 8/2001 | Rehbein | .............. | 410/41 |
| 6,514,022 B2 * | 2/2003 | Truckor et al. | .............. | 410/138 |
| 6,524,043 B2 * | 2/2003 | Earle et al. | .............. | 410/130 |
| 6,846,140 B2 * | 1/2005 | Anderson et al. | .............. | 410/104 |
| 6,974,170 B2 * | 12/2005 | Mulvihill | .............. | 296/24.4 |
| 7,214,018 B2 * | 5/2007 | Lussier | .............. | 410/130 |
| 7,281,889 B2 * | 10/2007 | Anderson et al. | .............. | 410/104 |
| 7,866,925 B1 * | 1/2011 | Matlack et al. | .............. | 410/34 |
| 8,100,460 B2 * | 1/2012 | Butlin et al. | .............. | 296/180.1 |
| 8,100,615 B1 * | 1/2012 | Freeborn | .............. | 410/130 |

(Continued)

*Primary Examiner* — H Gutman

(74) *Attorney, Agent, or Firm* — Mickki D. Murray; Parks Wood LLC

(57) ABSTRACT

An adjustable cargo storage press for organizing and securing cargo items stored in a cargo storage area of an automobile. The adjustable cargo storage press is disposed within or integrated with a cargo area of an automotive vehicle such as a trunk, bed or bed liner of a car, truck, or sport utility vehicle. The press prevents movement of cargo items and potential damage to the cargo items during transport. The press also maintains the position of the cargo items for easy removal from the cargo storage area. The press includes one or more hinged walls that lock in a vertical position and move towards each other along guide tracks. The one or more hinged walls compress the cargo items between the hinged walls, and fold flat when not in use so as not to limit cargo storage capacity of the cargo storage area.

21 Claims, 7 Drawing Sheets

(56) References Cited

U.S. PATENT DOCUMENTS

| | | | |
|---|---|---|---|
| 8,360,494 B2 * | 1/2013 | Quiros Perez | 296/24.4 |
| 8,371,782 B2 * | 2/2013 | Hill | 410/138 |
| 2003/0180567 A1 * | 9/2003 | Dunne et al. | 428/583 |
| 2007/0018473 A1 * | 1/2007 | Alliger et al. | 296/24.4 |
| 2008/0100092 A1 * | 5/2008 | Gao et al. | 296/146.11 |
| 2008/0101885 A1 * | 5/2008 | Kmita | 410/130 |
| 2008/0133090 A1 * | 6/2008 | Browne et al. | 701/49 |
| 2008/0203760 A1 * | 8/2008 | Cafeo et al. | 296/146.9 |
| 2008/0217941 A1 * | 9/2008 | Chernoff et al. | 296/1.02 |
| 2008/0272615 A1 * | 11/2008 | McKnight et al. | 296/180.5 |
| 2009/0058130 A1 * | 3/2009 | Ukpai et al. | 296/146.9 |
| 2009/0058132 A1 * | 3/2009 | Browne et al. | 296/181.7 |
| 2009/0108607 A1 * | 4/2009 | Browne et al. | 296/1.02 |
| 2013/0270858 A1 * | 10/2013 | Gaudig et al. | 296/184.1 |

* cited by examiner

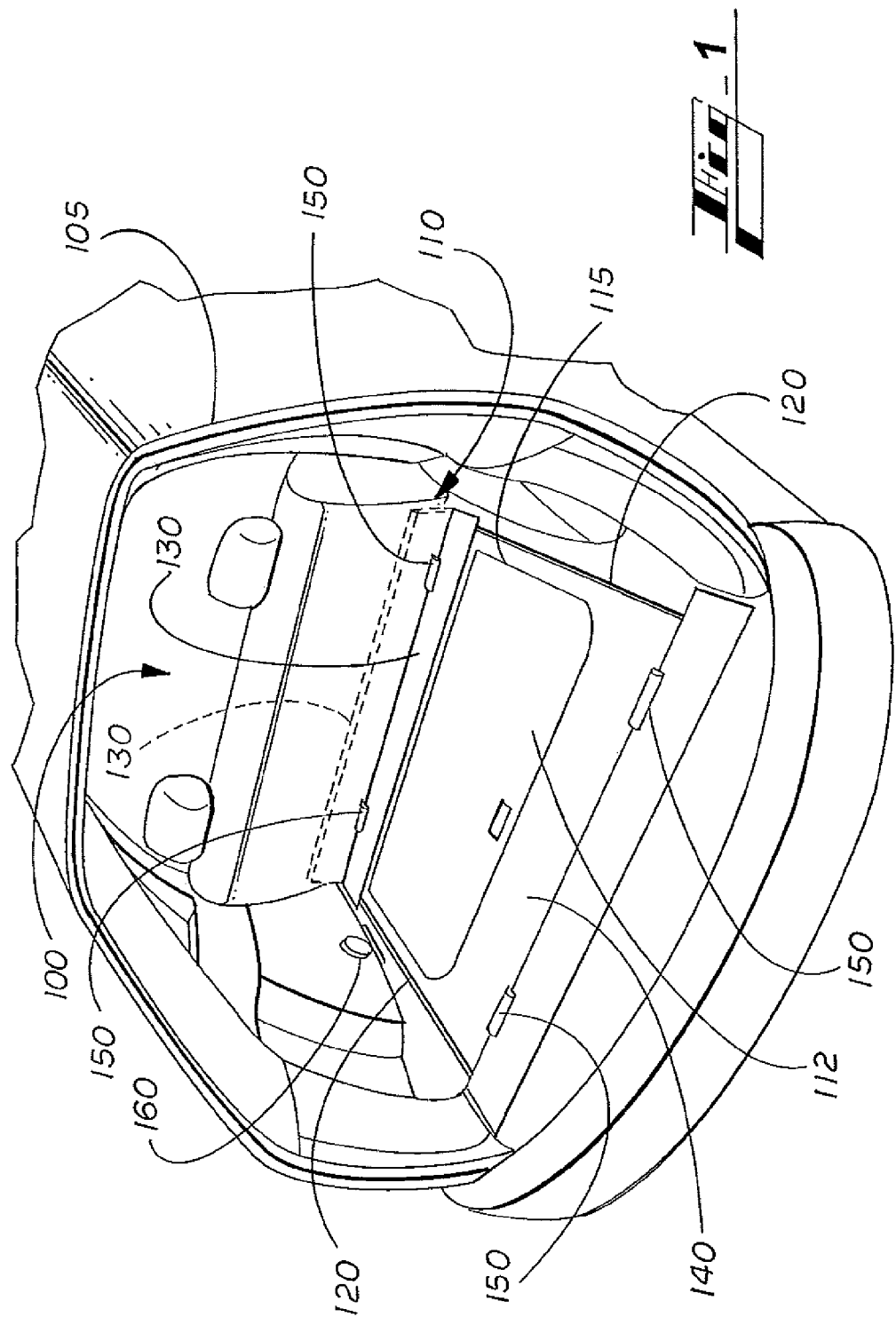

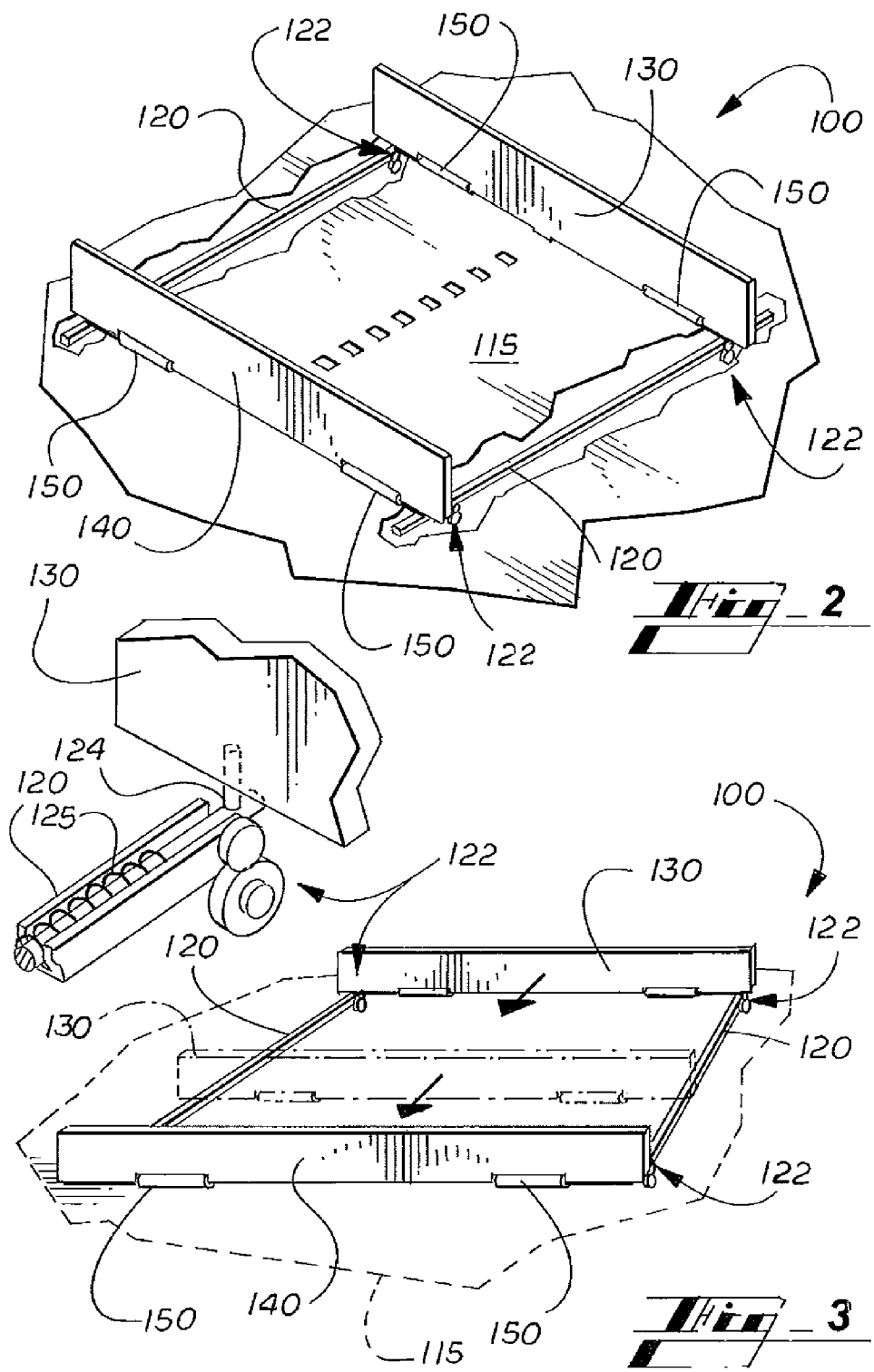

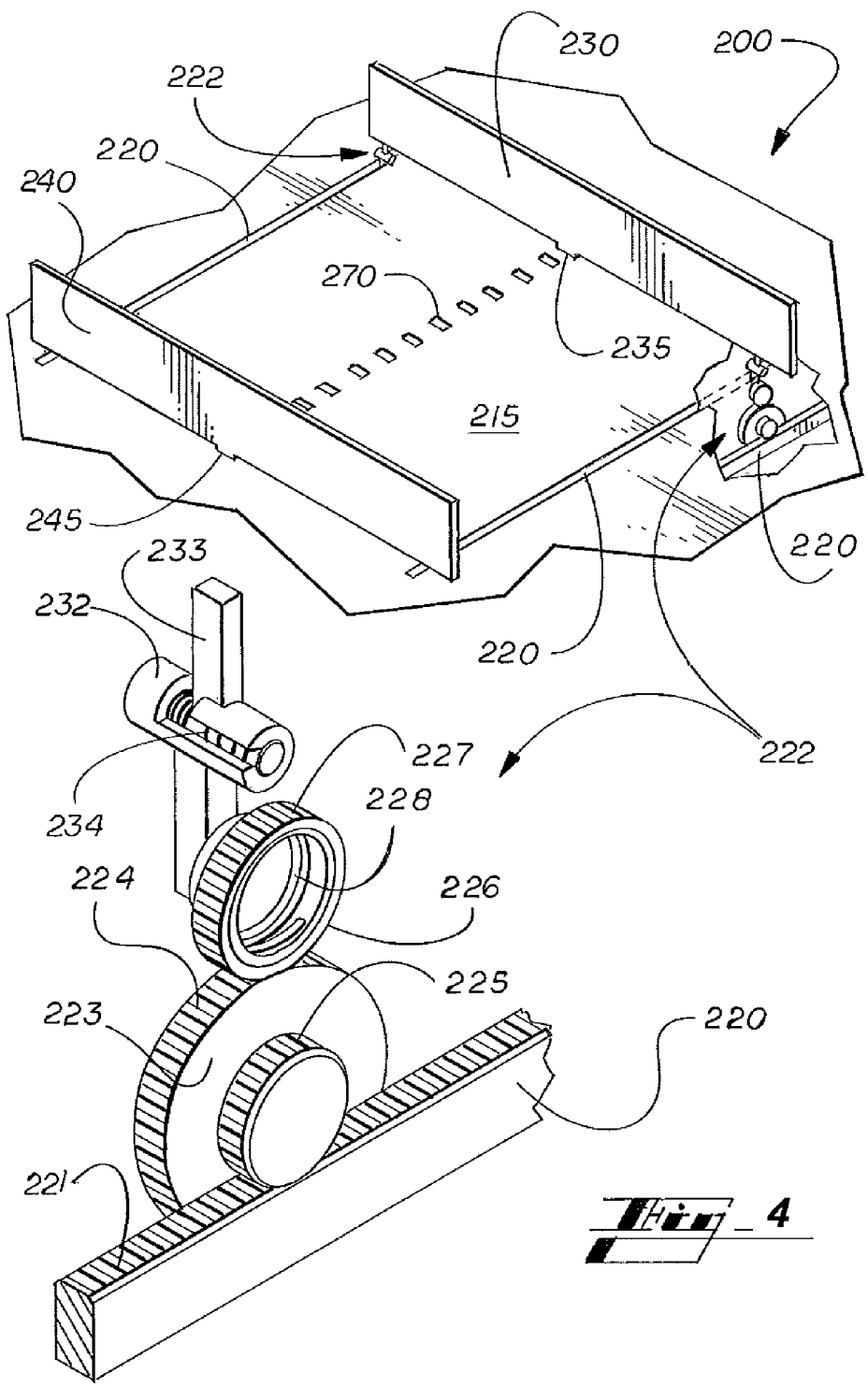

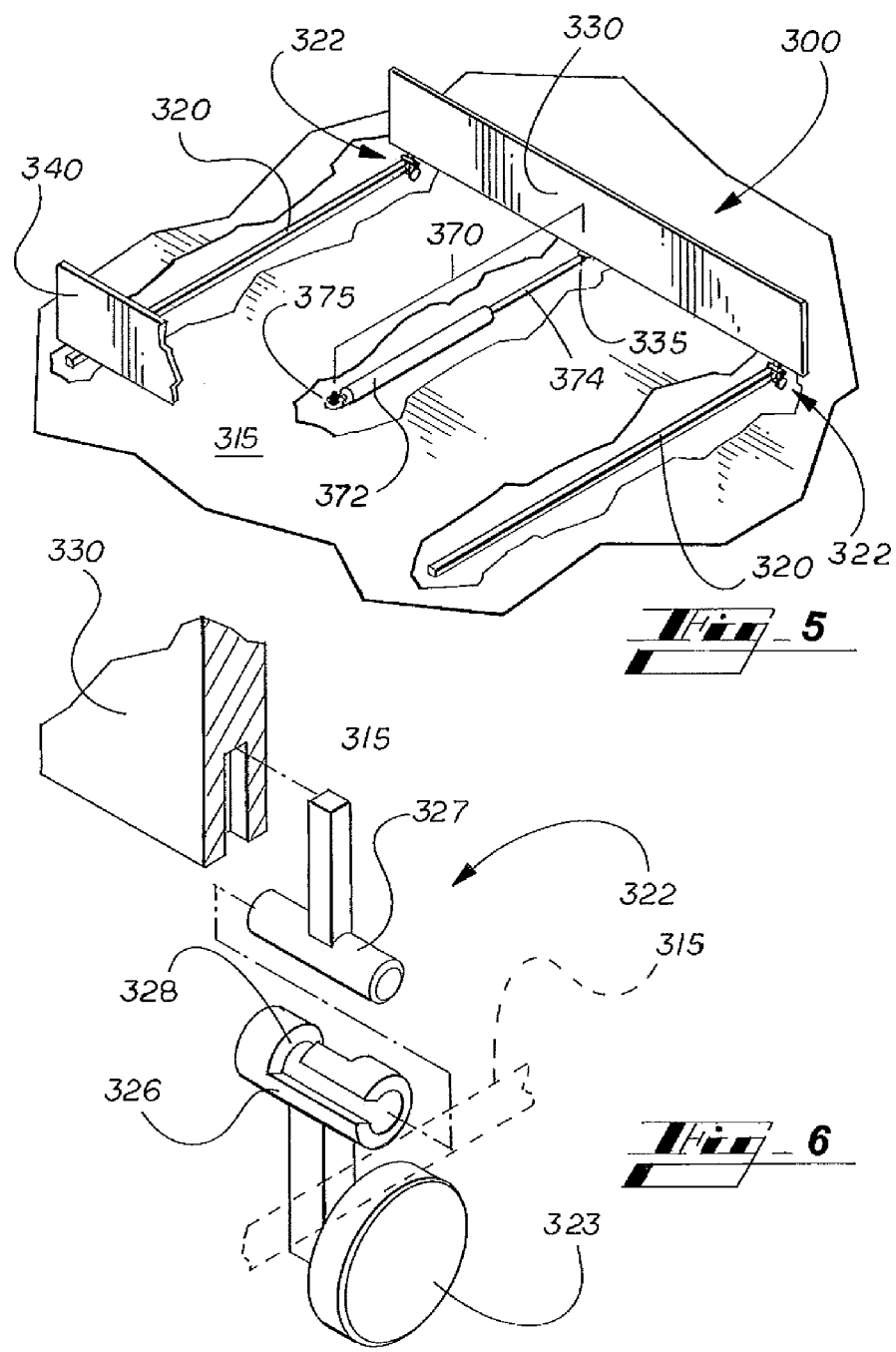

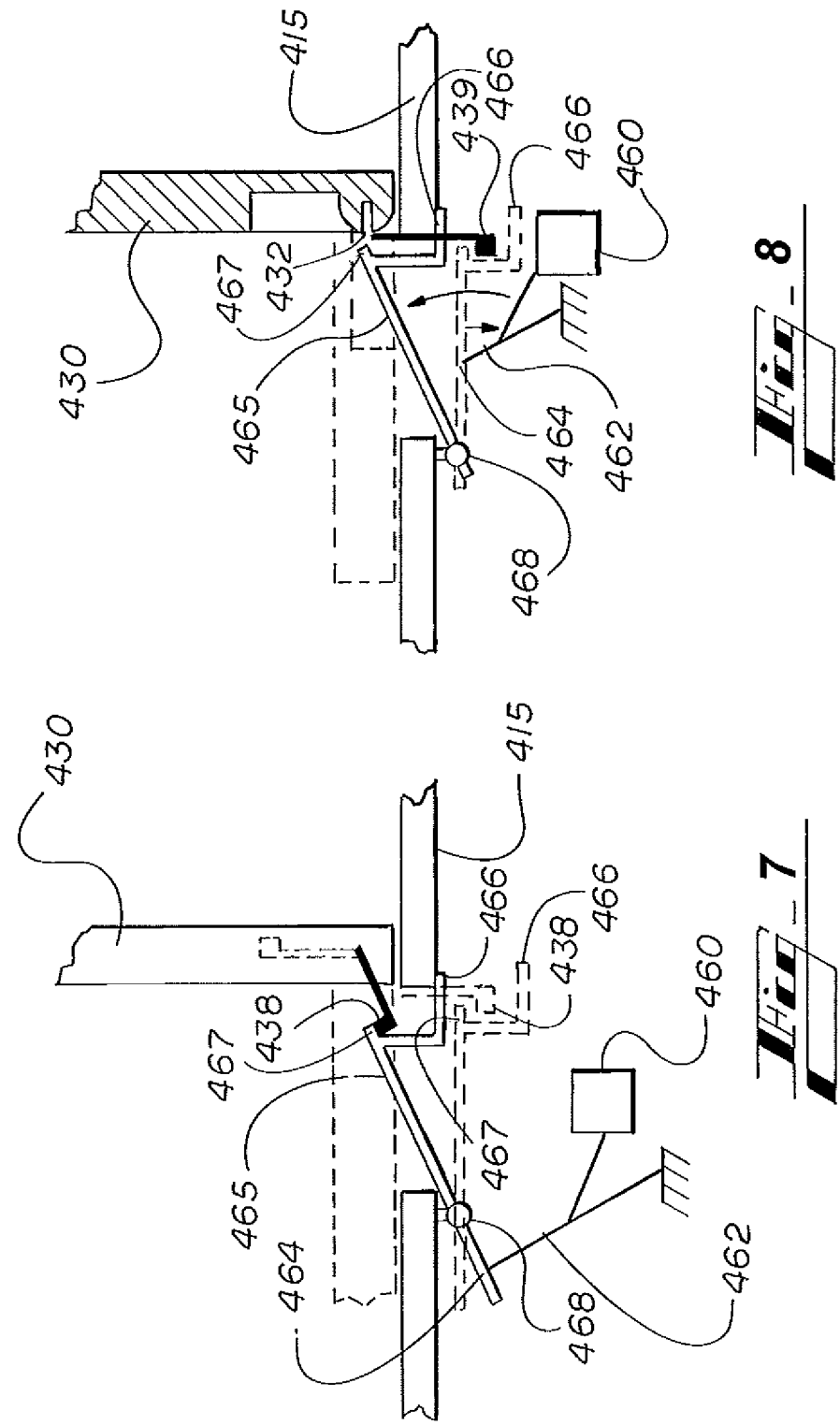

TRUNK, CARGO AREA, AND TRUCK BED STORAGE PRESS

I. FIELD OF THE DISCLOSURE

The present disclosure relates to a system for organizing and securing items stored in the rear cargo area of an automobile such that the items are immobilized during driving and are positioned for easy removal from the cargo area.

II. BACKGROUND OF THE DISCLOSURE

Automotive vehicles such as cars, trucks, sport utility vehicles (SUVs), and the like have become ubiquitous and are relied upon to transport people. These vehicles are also relied upon to transport a wide range of cargo. In order to transport cargo, these vehicles typically include dedicated cargo storage areas such as trunks, beds, and other similar payload space. These cargo storage areas often include utility space for storing items such as spare tires, emergency and maintenance equipment, tools, and the like. Cargo storage areas are utilized to store and transport a wide array of items including child care equipment, large pieces of luggage, school and work bags, grocery, and other items. Because cargo storage space is often a very desirable feature of a vehicle, they are often designed as an open, cavernous area in order to maximize the storage capacity.

However, while large, cavernous cargo spaces are suitable and preferred for providing maximum cargo area, these cavernous spaces present a problem with respect to securing cargo during transport and removing cargo from the vehicle. Because the open cargo storage areas often do not provide a suitable means of securing the cargo, the cargo is allowed to slide, roll, tumble, or otherwise move around during transport. The movement of unsecured cargo presents a heightened risk of the cargo being damaged or destroyed. This risk of damage or destruction is particularly high for fragile and special care items, e.g., groceries, liquids, and the like. The movement of unsecured cargo also allows cargo to move to an inconvenient location, e.g., a forward portion of the cargo storage area, such that removal of the item from the vehicle is inconvenient.

III. SUMMARY OF THE DISCLOSURE

In at least one embodiment, the present disclosure provides an adjustable cargo storage including a guide track and a hinged wall arrangement in communication with the guide track. The hinged wall arrangement also includes a hinged wall and a hinge attached to the hinged wall, wherein the hinge allows the hinged wall to pivot between a horizontal position and a vertical position. In operation, the hinged wall arrangement moves along the guide track to compress a cargo item between the hinged wall arrangement and another structure. In some embodiments, the hinged wall arrangement is a first hinged wall arrangement, the hinged wall is a first hinged wall, and the hinge is a first hinge. In these embodiments, the other structure may include a second hinged wall arrangement in communication with the guide track. The second hinged wall arrangement may include a second hinged wall and a second hinge attached to the second hinged wall, wherein the second hinge allows the second hinged wall to pivot between a horizontal position and a vertical position. In operation, at least one of the first hinged wall arrangement and the second hinged wall arrangement moves along the guide track towards the other of the first hinged wall arrangement and the second hinged wall arrangement to compress a cargo item between the first hinged wall arrangement and the second hinged wall arrangement.

In at least another embodiment, the present disclosure provides an adjustable cargo storage including a guide track and a first hinged wall arrangement in communication with the guide track. The first hinged wall arrangement also includes a first hinged wall and a first hinge attached to the first hinged wall, wherein the first hinge allows the first hinged wall to pivot between a horizontal position and a vertical position. The press also includes a second hinged wall arrangement adjacent the guide track, the second hinged wall arrangement including a second hinged wall and a second hinge attached to the second hinged wall, wherein the second hinge allows the second hinged wall to pivot between a horizontal position and a vertical position. In operation, the first hinged wall arrangement moves along the guide track towards the second hinged wall arrangement to compress a cargo item between the first hinged wall arrangement and the second hinged wall arrangement.

In at least another embodiment, the present disclosure provides an adjustable cargo storage including a guide track and a first hinged wall arrangement in communication with the guide track. The first hinged wall arrangement also includes a first hinged wall and a first hinge attached to the first hinged wall, wherein the first hinge allows the first hinged wall to pivot between a horizontal position and a vertical position. The press also includes a second hinged wall that pivots between a horizontal position and a vertical position, wherein the second hinged wall opposes the first hinged wall arrangement and is not in direct communication with the guide track. In operation, the first hinged wall arrangement moves along the guide track towards the second hinged wall to compress a cargo item between the first hinged wall arrangement and the second hinged wall arrangement.

IV. BRIEF DESCRIPTION OF THE DRAWINGS

FIG. 1 illustrates a perspective view of an adjustable cargo storage press in accordance with at least one embodiment of the present disclosure.

FIG. 2 illustrates a close-up perspective view of the adjustable cargo storage press in an actuated state, in accordance with at least one embodiment of the present disclosure.

FIG. 3 illustrates a perspective view of the adjustable cargo storage press in use, in accordance with at least one embodiment of the present disclosure.

FIG. 4 illustrates an enlarged, partial cut-away view of an alternative embodiment of a guide track and a roller bearing arrangement of the adjustable cargo storage press in accordance with at least one embodiment of the present disclosure.

FIG. 5 illustrates a perspective view of an alternative embodiment of the adjustable cargo storage press.

FIG. 6 illustrates an alternative embodiment of the roller bearing arrangement of the adjustable cargo storage press.

FIGS. 7-9 illustrate side views of alternative latch arrangements of the adjustable cargo storage press, prior to activation, in accordance with at least one embodiment of the present disclosure.

Figure 9:
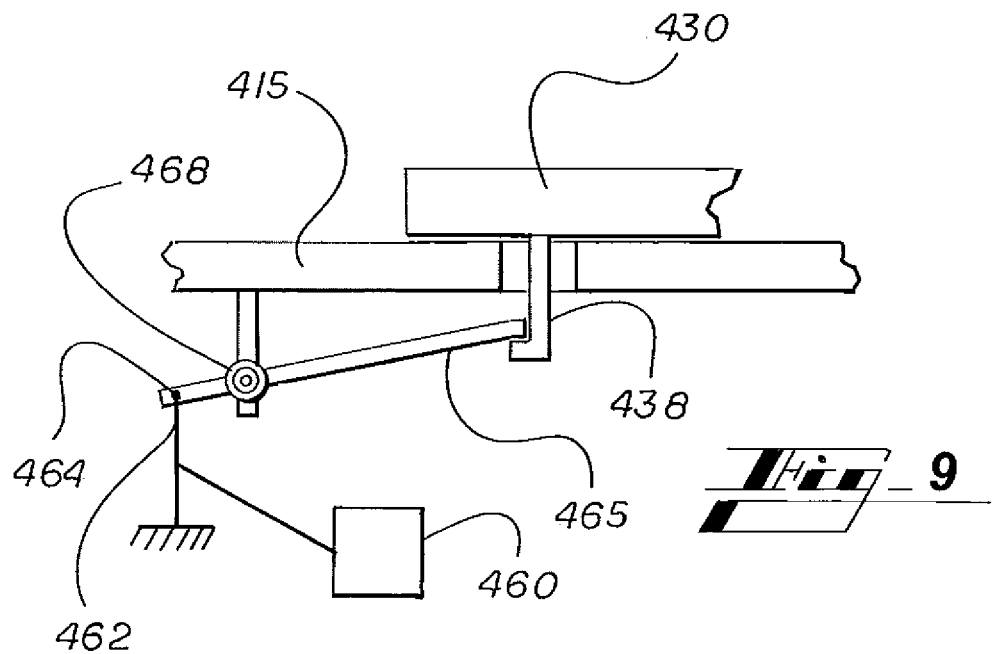
Figure 10:
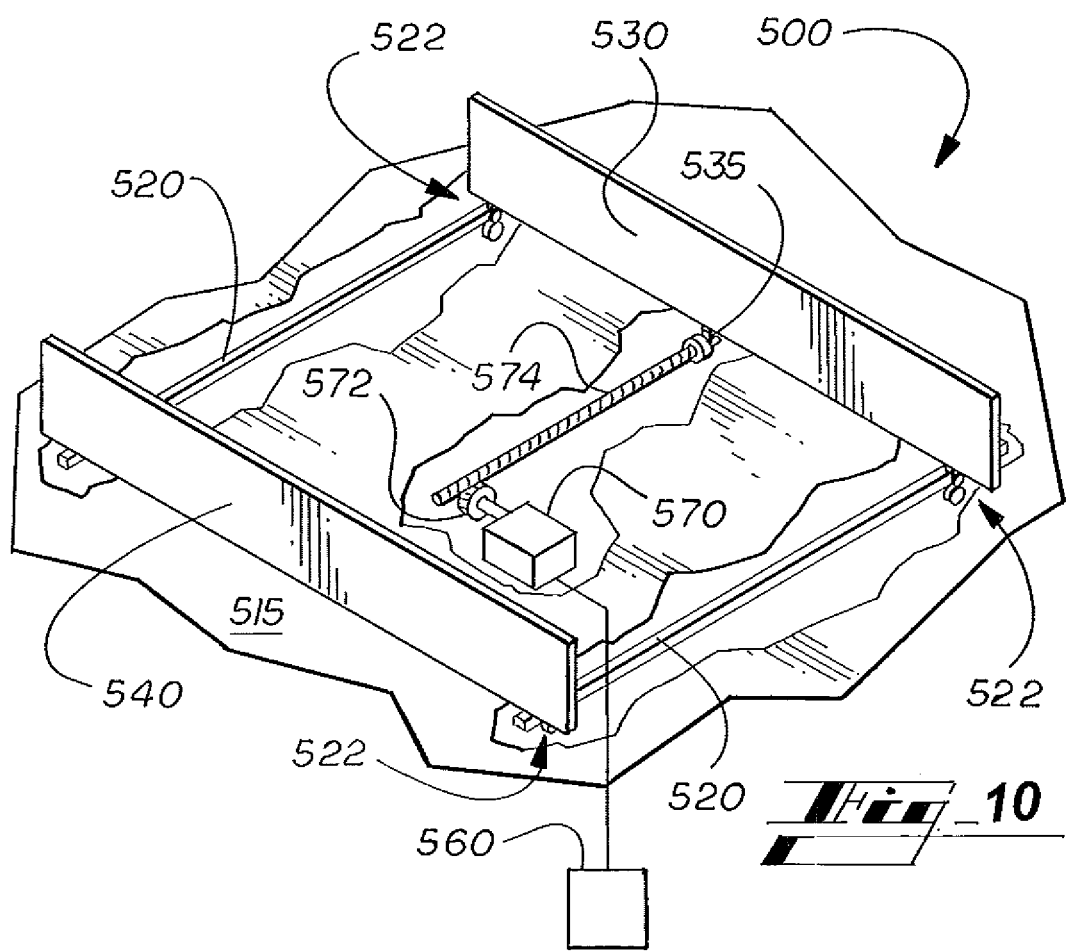
FIG. 10 illustrates a perspective view of another alternative embodiment of the adjustable cargo storage press in accordance with the present disclosure.

Given the following enabling description of the drawings, the novel features of the disclosure should become evident to a person of ordinary skill in the art.

V. DETAILED DESCRIPTION

The following detailed description is merely exemplary in nature and is not intended to limit the applications and uses disclosed herein. Further, there is no intention to be bound by any theory presented in the preceding background or summary or the following detailed description. While embodiments of the present technology are described herein primarily in connection with automotive vehicles, the concepts are applicable equally to any type of vehicle having cargo storage areas. Other vehicle types include, for example, aircraft, marine craft, and motorcycles. Also, while embodiments of the present disclosure are described and shown as being sized to fit cars and trucks, various sizes of the technology are envisioned as appropriate for the particular application, e.g., providing storage on a motorcycle.

In at least one aspect, the present disclosure describes a system and method for securing and organizing cargo within the cargo storage area of an automobile or similar vehicle, such as the trunk, bed, and rear cargo area of cars, trucks, and sport utility vehicles (SUVs). In one aspect, the present disclosure describes an adjustable cargo storage press that is deployable to organize and secure a variety of items within the cargo storage area of a vehicle. In another aspect, the present disclosure describes an adjustable cargo storage press that is conveniently stored when not in use such that the storage capacity of the cargo storage area is not diminish, yet the adjustable cargo storage press remains quickly and easily deployable.

FIGS. 1-3 illustrate an adjustable cargo press 100 in accordance with an embodiment of the present disclosure. FIG. 1 illustrates a perspective view of the adjustable cargo storage press 100 in accordance with at least one embodiment of the present disclosure. The adjustable cargo storage press 100 is disposed in the cargo storage area 110 of an automotive vehicle 105. The cargo storage area 110 includes a cargo load floor 115 that supports cargo item. The cargo load floor 115 may also include an optional lid 112 that forms a part of the cargo load floor 115. The lid 112 covers an optional secondary storage area (not show in detail), e.g., spare tire or maintenance equipment storage compartment.

The adjustable cargo press 100 is arranged to be integrated within the cargo storage area 110 in a manner that does not diminish the cargo storage capacity of the cargo storage area 110, e.g., flush with the cargo floor 115 of the automotive vehicle 105. The adjustable cargo press 100 is also arranged in a manner that does not obstruct the secondary cargo area. The adjustable cargo press 100 includes guide tracks 120, a roller bearing arrangement 122, a forward (fore) hinged wall 130, a rear (aft) hinged wall 140, hinges 150 and an activation switch 160. FIG. 1 shows the forward hinged wall 130 and rear hinged wall 140 in the folded flat position, i.e., prior to deployment or activation of the adjustable cargo press 100. While particular embodiments disclosed herein may include a set of guide tracks 120, i.e., two guide tracks, other envisioned embodiments may include a single guide track 120, or multiple guide tracks 120, i.e., three or more, without departing from the disclosure. In embodiments, having a single guide track 120, the guide track 120 may be substantially centered along the length of the cargo load floor.

Further, while particular embodiments disclosed herein may include opposing hinged walls, i.e., both a forward hinged wall 130 and a rear hinged wall 140, other envisioned embodiments may include only a single hinged wall, without departing from the disclosure. The single hinged wall may move along the guide tracks to compress cargo items between the single hinged wall and another structure, e.g., a car seat, cargo area side, front, or back wall, truck bed side, front, or back wall, and the like. Further, while particular embodiments disclosed herein may describe that both a forward hinged wall 130 and a rear hinged wall 140 are in communication with the guide tracks 120, other envisioned embodiments may include only a single hinged wall, i.e., a forward hinged wall 130 or a rear hinged wall 140, being in communication with the guide track 120, without departing from the invention. In these embodiments, the other hinged wall while not in direct communication with the guide tracks 120 may still abut or be proximate the guide tracks 120 such that the hinged walls 130, 140 can form a press.

FIGS. 2 and 3 illustrate other views of the adjustable cargo storage press in accordance with at least one embodiment of the present disclosure. FIG. 2 details the rotation of the forward hinged wall 130 and the rear hinged wall 140 about the corresponding hinges 150. As shown in FIG. 2, the hinged walls 130, 140 are attached to the guide tracks 120, e.g., via a roller bearing arrangement 122, such that one or both of the hinged walls 130, 140 are movable along the guide tracks 120 in order to organize and secure cargo items (not shown) between the hinged walls 130, 140. While particular embodiments disclosed herein may include multiple roller bearing arrangements 122 or multiple gear arrangements 222 that connect both hinged walls 130, 140 to the guide tracks 120 (see, e.g., FIGS. 2-4 and 10), other envisioned embodiments may include only one hinged wall being connected to the guide tracks. In some embodiments, when a hinged wall is not connected to the guide tracks, the hinged wall may be placed adjacent to the guide tracks such that a press can still be formed by the two opposing walls.

The hinged walls 130, 140 may also be connected to the roller bearing arrangement 122 via hinges 150. The hinges 150 may include, for example, an elongated member (see darkened element between hinge 150 and roller bearing 122) that connects the hinge 150 to roller bearing arrangement 122. The hinges 150 allow the hinged walls 130, 140 to fold flat into a depression (not shown in detail) of the cargo load floor 115 when the adjustable cargo storage press 100 is not in use. For when the adjustable cargo storage press 100 is engaged and in use, the hinges 150 in one embodiment allow the hinged walls 130, 140 to rotate and lock in a vertical position, as discussed below with respect to FIG. 3. While particular embodiments disclosed herein may include one or multiple hinges 150, other envisioned embodiments may eliminate the hinges 150, without departing from the disclosure. In other embodiments, the hinge feature may be provided by other similar and/or equivalent structures.

In the illustrated embodiment, the guide tracks 120 are disposed under or substantially flush with the cargo load floor 115 in a manner that does not obstruct the cargo load floor 115 or cargo storage area 110. As shown, the guide tracks 120 are positioned beneath slots in the cargo load floor 115. However, in alternative embodiments, the guide tracks 120 may also be positioned in sides of the storage are 110. The guide tracks 120 or the slots may include optional brushes (not shown) disposed above the guide track 120 and substantially flush with the cargo load floor 115 to assist with preventing debris from passing through the slots and entering the guide track 120. The adjustable cargo storage press 100 may also include optional calendared wall-locking slots 270 (shown in FIG. 4) formed in the cargo load floor 115 or lid 112. The calendared wall-locking slots 270 are designed to engage a corresponding structure on the hinged walls 130, 140 (see reference numerals 235 and 245 in FIG. 4) to assist with locking the hinged walls 130, 140 in a longitudinal position along the cargo load floor 115.

FIG. 3 details the movement of the hinged walls 130, 140 along the guide tracks 120. In one embodiment, the adjustable cargo press 100 is engaged by an activation switch, as described further below and shown in subsequent figures. As discussed in more detail below with respect to FIGS. 5-7, in order to deploy the adjustable cargo storage press 100, the activation switch may include, for example, a shape memory alloy or smart metal alloy (SMA) wire that engages a triggering mechanism, e.g., a spring-loaded latch. A roller bearing arrangement 122 connects the hinged walls 130, 140 to the guide track 120. The roller bearing arrangement 122 can be considered a part of the guide track 120, or a distinct component. When deployed and in use, a tension mechanism 125, e.g., an extension spring within the guide track 120, causes at least one of the hinged walls 130, 140 to slide towards the other of the hinged walls 130, 140. For example, the tension mechanism 125 causes the forward hinged wall 130 to slide towards the rear hinged wall 140. The roller bearing arrangement 122 includes a wall-locking component 124, e.g., a locking vertical hinge, that locks and maintains the hinged walls 130, 140 in the vertical position while the adjustable cargo storage press 100 is deployed.

The tension mechanism 125 also supplies a sufficient force pressure on the hinged walls 130, 140 such that cargo items can be securely stored between the hinged walls 130, 140 in a manner that prevents the cargo items from moving. More specifically, the force applied on the hinged walls 130, 140 by the tension mechanism 125 causes the hinged walls 130, 140 to squeeze cargo items between the hinged walls 130, 140. The force applied on the hinged walls 130, 140 may be tuned by adjusting the spring of the tension member 125. It will be appreciated that the walls 130, 140 need not always touch the cargo during use of the press 100, but just need to provide a barrier at an appropriate location of the storage area to keep the cargo from moving further than desired by the user.

In one embodiment, the hinged walls 130, 140 are preferably formed of a substantially rigid material that provides sufficient force to secure the cargo items. However, in at least some embodiments, the hinged walls 130, 140 allow a slight degree of flexing in order to prevent the application of excessive force such that the risk of damaging the cargo items is diminished.

In at least one embodiment, the engagement switch 160, when activated, deploys the hinged walls 130, 140 to a vertical position by releasing a latch (not shown here, see FIGS. 7-9 below). The release of the latch 465 allows the hinged walls 130, 140 to rotate vertically, for example, by being activated by rotational spring forces. In one embodiment, a biasing component, such as a rotational spring, is connected to the hinged walls 130, 140 and the roller bearing arrangement 122 so as to cause the hinged walls 130, 140 to move from a flat position to a locked vertical position when the latch 465 is released. The hinged walls 130, 140, if needed, may optionally be deployed by hand by rotating from a flat folded position to a locked vertical position. The rotational spring forces cause at least one of the hinged walls 130, 140 to move towards the other of the hinged walls 130, 140 to securely and gently compress the stored cargo items. When not in use, the hinged walls 130, 140 may be rotated and locked in the flat position. In some embodiments, one of the hinged walls 130, 140 may remain fixed in a stationary longitudinal position while the other of the hinged walls 130, 140 moves longitudinally along the guide tracks 120. Both hinged walls 130, 140 rotate from a flat position to a vertical position.

FIG. 4 illustrates an enlarged, partial cut-away view of an alternative embodiment of the adjustable cargo storage press 200, including an alternative embodiment of the guide track and roller bearing arrangement. The adjustable cargo press 200 of this embodiment includes similar components as the adjustable cargo press 100 discussed above with respect to FIGS. 1-3, including guide tracks 220, a forward hinged wall 230, a rear hinged wall 240, and an activation switch (not shown in FIG. 4).

The adjustable cargo press 200 of this embodiment includes gear arrangements 222. The gear arrangements 222 may be formed, for example, by a first gear 223 having teeth 224, 225 and a second gear 226 having teeth 227 and a biasing component 228, e.g., a rotational spring. The details of the gear arrangement 222 are shown in the exploded view. The gear arrangements 222 are included on both sides of one or both of the hinged walls 230, 240. The teeth 223 of the gear arrangement 222 engage teeth 221 of the guide track 220. The hinged walls 230, 240 are connected to the gear arrangements 222 via a hinge 232, e.g., a barrel hinge, formed by a pin 233 that fits within the hinge 232. The hinge 232 also includes a biasing component 234, e.g., a rotational spring, disposed within the barrel and around the pin 233. Upon release of the latch, shown in FIGS. 7-9, the biasing component 228 via gears 226 and 223 pushes the hinged walls 230, 240 longitudinally along the guide tracks 220. Also upon release of the latch, the biasing component 234 of hinge 232 causes the hinged walls 230, 240 to rotate and lock in a vertical position. The locking feature of the hinge 232 is discussed in more detail below with respect to FIG. 6.

The forward hinged wall 230 and rear hinged wall 240 may also include a projection 235, 245, respectively, or other similar structures that mate with one or more corresponding locking structures 270, e.g., calendared wall locking slots formed in the cargo load floor 215. The projections 235, 245 and the calendared wall locking slots 270 engage each other to assist with locking the hinged walls 230, 240 in a longitudinal position along the cargo load floor 215. For example, the projections 235, 245 can include structures, e.g., flat protrusions, that mate each other to prevent the hinged walls 230, 240 from advancing further in a longitudinal direction.

FIGS. 5 and 6 illustrate another alternative embodiment of the adjustable cargo storage press. As shown in FIG. 5, the adjustable cargo press 300 of this embodiment includes similar components as the adjustable cargo press 100, discussed above with respect to FIGS. 1-3. The adjustable cargo storage press 300 includes guide tracks 320, a roller bearing arrangement 322, a forward hinged wall 330, a rear hinged wall (not shown in order to show other details), and an activation switch (not shown). The adjustable cargo press 300 also includes a damper 370, e.g., a gas spring and rod, that anchors the hinged walls 330, 340 to the vehicle (e.g., automobile), and/or the hinged walls 330, 340 at anchor points 335, 375. Similar to the guide tracks 320, the damper 370 is disposed underneath the cargo load floor 315 such that the cargo storage area is not obstructed. The damper 370 and anchor point 335 are disposed beneath the cargo load floor 315 and are accessible through slots in the cargo load floor 315. In one embodiment, the damper 370 includes a gas spring 372 in communication with a rod 374. Upon activation of the adjustable cargo storage press, by releasing the latch 465 via switch, as discussed below with respect to FIGS. 7-9, the damper 370 forces the forward hinged wall 330 rearward towards the rear hinged wall. More specifically, when the latch 465 is released by application of the switch, the hinged wall 330 moves to a vertical position and the rod 374 of damper 370 moves longitudinally towards the gas spring 372 thereby moving hinged wall 330 longitudinally along the guide tracks 320 towards the rear hinged wall.

The damper 370 also assists with maintaining the longitudinal position of the forward hinged wall 330 along the guide tracks 320 such that cargo items can be secured between the forward hinged wall 330 and rear hinged wall. More specifically, in addition to the roller bearing arrangement 322 and/or the optional calendared wall locking slots (not shown here, see FIG. 4 above), the damper 370 forces at least one of the walls (e.g., the forward hinged wall 330 in the embodiment of FIG. 5) towards the other of the hinged walls in order to secure cargo items between the hinged walls.

FIG. 6 illustrates an embodiment of the roller bearing arrangement 322. The roller bearing arrangement 322 is an alternative to the gear arrangement 222 shown in FIG. 4 for movably connecting the hinged wall(s) to the guide track.

As shown, the roller bearing arrangement 322 connects the wall 330 to the guide track 320 and locks the wall 330 in the vertical position. The roller bearing arrangement 322 includes a roller 323 and a hinge 326. The roller 323 is designed to cooperate with the guide tracks 320 and allow the forward hinged wall 330 to move longitudinally along the guide tracks 320. The hinge 326 includes a barrel connected to the roller bearing arrangement 322, and a pin 327 connected to the hinged walls 330, 340 and hinge 326 of the roller bearing arrangement 322. The barrel of the hinge 326 includes a tapered slot 328 and/or notch that locks the pin 327 such that the hinged walls 330, 340 are maintained in a vertical position.

FIGS. 7-9 illustrate side views of alternative embodiments of a biasing arrangement, or latch arrangement, of an adjustable cargo storage. FIGS. 7 and 8 show the latch arrangement after activation of the adjustable cargo storage press—i.e., after the activation switch 460 has been engaged. As shown in FIGS. 7 and 8, prior to activation, a biasing component 465, such as a spring-loaded arm or latch, is disposed fully beneath and connected to the cargo load floor 415 via a tension element 468, e.g., a rotational spring. A portion of the latch 465, e.g., latch tip or engagement lip 467, may engage a corresponding structure, e.g., pin or clip 438 or 439, in FIGS. 7 and 8, respectively, that maintains the hinged wall 430 in the flat (horizontal) position. The tension element 468 may be designed to apply an appropriate force on the latch 465, e.g., rotational spring force, to maintain the hinged wall 430 in the flat (horizontal) position. Upon activation of the switch 460, the latch 465 at engagement lip 467 releases the clip 438, and the hinged wall 430 is allowed to move/pivot via hinges (not shown) to the vertical position. In some embodiments, the latch 465 fits within a hole or cutout in the cargo floor 415 that allows the latch 465 to pivot upward. The latch 465 substantially covers the hole and helps prevent items from falling into the hole.

In one embodiment, the spring-loaded latch 465 is activated by switch 460, such as via a shape memory alloy or smart metal alloy (SMA) wire 462 that is attached to the spring-loaded latch 465 at an appropriate anchor point 464. The anchor point 464 may be placed relative to the tension element 468, such as a rotational spring, as appropriate, to activate the spring-loaded latch 465. After activation, the hinged wall 430 may be returned to the flat/folded position, for example, by manually pushing the hinged wall 430 (and/or latch 465) flat to the cargo load floor 415 such that the rotational spring 468 is reset and the clip 438 holds the hinged wall 430 flat. In at least some embodiments, the SMA wire 462 is arranged to, when activated, cause the SMA wire 462 to pull and release the latch 465. The SMA wire 462 may be anchored at suitable angles, e.g., approximately 45 degree angles, such that the SMA wire 462 changes dimensions when activated, thereby releasing the wall 430 from the flat position via latch 465 and clip 438. In at least one embodiment, upon release of the wall 430 from latch 465, the wall 430 may be manually moved to the vertical position. In a contemplated embodiment, a shape memory element 462 (e.g. SMA wire), or other type of actuator, is connected to the hinged wall and activated in response to a trigger (e.g., user pressing a button) to pull the hinged wall 430 from its vertical position to its horizontal position. One or separate actuators can be used in an embodiment to assist with the opening and closing of the hinged wall 430.

In the alternative embodiment shown in FIG. 7, upon activation of the switch 460, the SMA wire 462 pulls the latch 466 at anchor point 464. Pulling of the latch 465 at anchor point 464 causes the latch 465 to pivot up on tension element 468. Pivoting of the latch 465 causes the engagement lip 467 to move upward thereby allowing clip 438 to also move upward. Allowing the clip 438 to move upward allows the wall to move/pivot via hinges (not shown) from the flat (horizontal) position to a vertical position. The clip 438 may also be optionally stored or stowed, for example, in a void in the hinged wall 430 such that the clip 438 is within or substantially flush with the hinged wall 430. The hinged wall 430 may be returned to the flat (horizontal) position, for example, by removing the clip 438 from the stored/stowed position and manually pressing the wall 430 flat until the tension element 468 is reset such that the engagement lip 467 maintains the hinged wall 438 in a flat position via clip 438. In the alternative embodiment shown in FIG. 8, upon activation of the switch 460, the SMA wire 462 pulls the latch 465 at anchor point 464. Pulling of the latch 465 at anchor point 464 causes the latch 465 to pivot down on tension element 468. Pivoting of the latch 466 causes the engagement lip 467 to pull down on a corresponding structure 439, e.g., a spring-loaded pin, in communication with the hinged wall 430. The pin 439 may be arranged to attach to the hinged wall 430, for example, via a slot 432 that maintains the hinged wall 430 in the flat (horizontal) position. The pin 439 may, for example, be attached to the cargo floor 415 such that the pin 439 moves vertically. The pin 439 engages the slot 432 in hinged wall 430. Upon the latch 465 being pulled down, the engagement lip 467 pulls the pin 439 down such that the pin 439 is disengaged from the wall 430 thereby allowing the wall 430 to move/pivot via hinges (not shown) from the flat (horizontal) position to a vertical position. The hinged wall 430 may be returned to the flat (horizontal) position, for example, by removing the clip 438 from the stored/stowed position and manually pressing the wall flat until the engagement lip 467 and clip 438 are engaged. The engagement lip 467 and/or the pin 439 may be formed, for example, of a resilient material that provides sufficient rigidity to maintain the hinged wall in the flat position.

FIG. 9 shows an alternative latch arrangement prior to activation of the adjustable cargo storage press. The spring-loaded latch 465 holds the hinged wall 430 flush with the cargo load floor 415 via a clip or pin 438 connected to the hinged wall 430. The spring-loaded latch 465 is disposed beneath the cargo load floor 415 and attaches to the clip 438 to keep the hinged wall 430 flat until the adjustable cargo storage press is activated. The spring-loaded latch 465 includes a tension element 468, e.g., a rotational spring, and is connected to a switch 460 via anchor point 464. The switch 460 causes an SMA wire 462 to actuate as described above. The SMA wire 462 can be connected to the latch 465 in any of a variety of ways, as also described above. When the wire 462 is actuated, it causes an end of the spring-loaded latch 465 adjacent the pin 438 to move such that the latch releases the clip 438, thereby allowing the hinged wall 430 to be moved to a vertical position. In some embodiments, the hinged wall 430 may be moved to a vertical position, for example, by a separate element, such as roller bearing arrangement 322 discussed above. In other embodiments, the hinged wall may be manually moved to vertical and horizontal (flat) positions.

The SMA wire 462, shown in FIGS. 7-9, is formed of shape memory materials which have the ability to return to their original shape upon the application or removal of external stimuli, e.g., heat or electrical current. This allows the SMA wire 462 to be used as an actuator to apply a force that results in a desired motion. The SMA wire 462 allows a reduction in actuator size, weight, volume, cost, and noise. This arrangement allows for a relatively simple yet robust actuator in comparison with traditional electromechanical and hydraulic means of actuation.

FIG. 5 illustrates a perspective view of an alternative embodiment of the adjustable cargo storage press. FIG. 5 provides a motorized embodiment of the adjustable cargo storage press in accordance with the present disclosure. The adjustable cargo storage press 500 of this embodiment includes guide tracks 520, a roller bearing arrangements 522, a forward hinged wall 530, a rear hinged wall 540, a screw connector 535, a motor 570, a gear 572 and a screw drive rod 574. The guide tracks 520 are disposed beneath the cargo load floor 515 and accessible via slots in the cargo load floor 515. The roller bearing arrangements 522 connect the forward hinged wall 530 to the guide tracks 520 and allow the forward hinged wall 530 to move in a longitudinal direction along the guide tracks 520 towards the rear hinged wall 540. In some embodiments, roller bearing arrangements 522 are included on both the forward hinged wall 530 and the rear hinged wall 540 such that the forward hinged wall 530 and/or rear hinged wall 540 are movable between a horizontal (flat/folded) position and a vertical position, for example, as discussed above with respect to FIGS. 4-6. The motor 670 is connected to the forward hinged wall 530 via a gear 572, a screw drive rod 574, and a screw connector 535. The screw drive rod includes threads or similar structures that engage the screw connector 535 such that the hinged wall 530 is moved in a longitudinal direction when the screw drive rod 574 is turned by the motor 570. The screw drive rod 574 is turned by the motor 572 via a gear 572 connected to the motor 570.

In one embodiment, the motor 570 is a simple direct drive motor that is capable of operating in both directions. In some embodiments, the motor 570 and gear 572 are replaced by similar devices, such as linear actuators and the like, that are capable of driving the screw drive 574 or a similar drive member in both directions.

Upon activation of the motor 570 by a switch 560, the motor 570 causes the screw drive to turn, thereby causing the screw connector 535 to move longitudinally, and so causing the forward hinged wall 530 connected to the connector 535 to move likewise longitudinally, along the guide tracks 520. This motion can be rearward, towards a rear hinged wall 540, or forward depending on the direction that the screw drive 574 is turned.

The motor 570 and screw drive rod 574 also maintain the forward hinged wall 530 in position in order to secure cargo items between the forward hinged wall 530 and rear hinged wall 540. While this embodiment has been described primarily in terms of the forward hinged wall 530 being connected to and movable by the motor 570, in some embodiments the arrangement may be reversed such that the rear hinged wall 540 is connected to and movable by the motor 570 along the guide track 520 by roller bearing arrangements 522. In other embodiments, both the forward hinged wall 530 and rear hinged wall 540 may be connected to and movable longitudinally along the guide tracks 520 by one or more motors.

Figure 11:
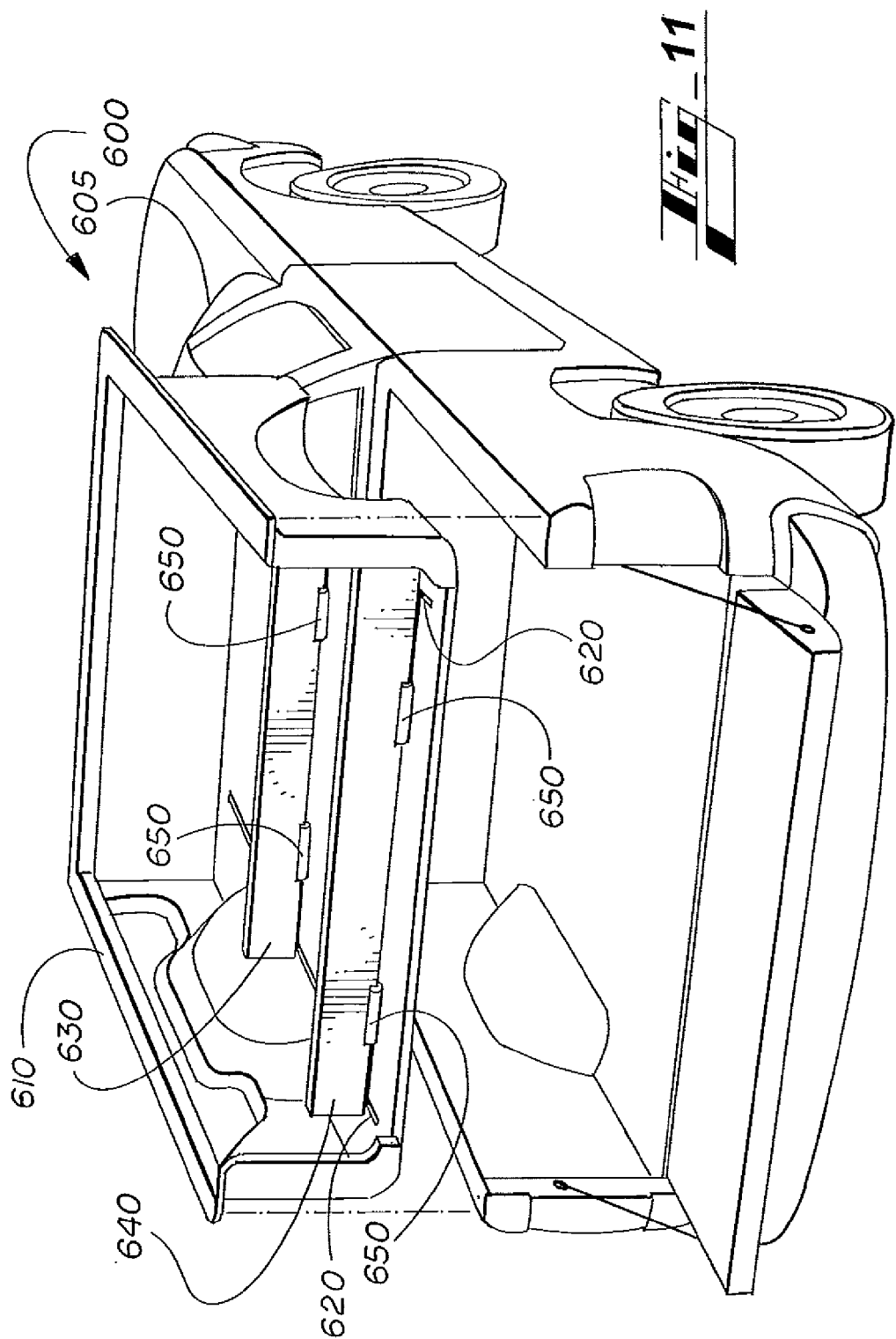
FIG. 11 illustrates a perspective view of still another alternative embodiment of the adjustable cargo storage press in accordance with the present disclosure.

FIG. 11 illustrates a perspective view of another alternative embodiment of the adjustable cargo storage press. FIG. 11 shows the adjustable cargo storage press 600 before and after installation in the bed of truck 605. FIG. 11 provides an adjustable cargo storage press 600 that may be similar, for example, to adjustable cargo storage presses 100, 200, 300 and 500, discussed above. However, adjustable cargo storage press 600 may be disposed within or integrated with a bed or bed liner 610 of a vehicle (e.g., truck) 605. The adjustable cargo storage press 600 of this embodiment is configured to be disposed within or integrated in the truck 605 in a manner that does not diminish the cargo storage capacity of the cargo storage area of the bed or bed liner 610, i.e., the adjustable cargo storage press 600 is arranged to be flush with a surface of the bed or bid liner 610 of the truck 605.

The adjustable cargo storage press 600 includes guide tracks 620, a forward hinged wall 630, a rear hinged wall 640, hinges 650 and, optionally, an activation switch (not shown), similar to the components described above regarding other embodiments. The walls of forward hinged wall 630 and rear hinged wall 640 are capable of moving about hinges 650 from a horizontal (flat/folded) position to a vertical position. The press 600 can operate generally like any of the presses of the other embodiments described herein. For example, the forward hinged wall 630 can be movable along the guide tracks towards the rear hinged wall 640 such that cargo items can be secured between the forward hinged wall 630 and rear hinged wall 640.

VI. CONCLUSION

While the present disclosure has been described in terms of particular preferred and alternative embodiments, it is not limited to those embodiments. For example, in some embodiments, the invention may include one movable hinged wall or two movable hinged walls. In some embodiments, both of the rear hinged wall and the forward hinged wall are movable. And in some embodiments, one of the walls (e.g., the rear hinged wall) is movable and the other (e.g., the forward hinged wall) is stationary. Further, the components disclosed in the various embodiments may be combined to form one or more alternative embodiments without departing from the disclosure.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. An adjustable cargo storage press, for use in a vehicle, comprising:
   a guide track; and
   a hinged-wall arrangement in communication by way of a connector arrangement with the guide track, the hinged-wall arrangement comprising:
      a hinged wall; and
      a hinge attached to the hinged wall, wherein the hinge allows the hinged wall to pivot between a horizontal position, in which the hinged wall is flat against or substantially flush with a cargo load floor of the vehicle, and a vertical position;
   wherein the press is configured so that, in operation, the hinged-wall arrangement moves along the guide track to compress, when the hinged wall is in the vertical position, a cargo item between the hinged-wall arrangement and another structure.

2. The adjustable cargo storage press according to claim 1, wherein:
   the hinged-wall arrangement is a first hinged-wall arrangement, the hinged wall is a first hinged wall, and the hinge is a first hinge;
   the other structure includes a second hinged-wall arrangement in communication with the guide track, the second hinged-wall arrangement comprising:
      a second hinged wall; and
      a second hinge attached to the second hinged wall, wherein the second hinge allows the second hinged wall to pivot between a horizontal position and a vertical position; and
   the press is configured so that, in operation, at least one of the first hinged-wall arrangement and the second hinged-wall arrangement moves along the guide track towards the other of the first hinged-wall arrangement and the second hinged-wall arrangement to compress, when each of the first and second hinged walls is in the vertical position, a cargo item between the first hinged-wall arrangement and the second hinged-wall arrangement.

3. The adjustable cargo storage press according to claim 1, further comprising:
   an activation switch configured to release the hinged wall from a temporary locked position in response to the switch being activated; and
   a shape-memory component in operative communication with the activation switch and the hinged-wall arrangement for selectively releasing the hinged-wall arrangement.

4. The adjustable cargo storage press according to claim 3, further comprising a latch in operative communication with the shape-memory component and the hinged wall, wherein activation of the switch releases the latch and allows the hinged wall to pivot from the horizontal position to the vertical position.

5. The adjustable cargo storage press according to claim 1, further comprising a locking structure associated with the hinged wall, wherein the locking structure is configured and arranged in the press to, in operation, selectively engage a corresponding locking structure formed in the cargo load floor to lock the hinged-wall arrangement in a position with respect to a direction that the track extends.

6. The adjustable cargo storage press according to claim 1, further comprising a damper connected to the hinged wall and to the vehicle, wherein the damper is configured and arranged in the press to, in operation, cause the hinged wall to move in a longitudinal direction, and wherein the damper maintains a longitudinal position of the hinged wall.

7. The adjustable cargo storage press according to claim 1, further comprising a motor in communication with the hinged-wall arrangement, wherein the motor causes the hinged-wall arrangement to move in a longitudinal direction.

8. The adjustable cargo storage press according to claim 1, wherein the guide track and the wall arrangement are integrated with a cargo liner of the vehicle.

9. The adjustable cargo storage press according to claim 1, wherein the guide track and the wall arrangement are positioned within a vehicle cargo area being a truck bed.

10. The adjustable cargo storage press according to claim 1, wherein the structure includes a second hinged wall that pivots between a horizontal position and a vertical position, wherein the second hinged wall opposes the first hinged-wall arrangement and is not in direct communication with the guide track.

11. The adjustable cargo storage press according to claim 1, wherein the connector arrangement includes at least one component selected from a group consisting of a roller bearing and a gear.

12. An adjustable cargo storage press comprising:
   a guide track;
   a hinged-wall arrangement in communication with the guide track, the hinged-wall arrangement comprising:
      a hinged wall; and
      a hinge attached to the hinged wall, wherein the hinge allows the hinged wall to pivot between a horizontal position and a vertical position;
   an activation switch in operative communication with a latch connected to the hinged-wall arrangement in a selectively lockable manner; and
   a shape-memory component in operative communication with the activation switch and the hinged-wall arrangement for selectively releasing the hinged-wall arrangement.

13. The adjustable cargo storage press according to claim 12, wherein:
   the latch is in operative communication with the shape-memory component; and
   activation of the switch allows the hinged wall to pivot to a vertical position.

14. The adjustable cargo storage press according to claim 12, further comprising a locking structure associated with the hinged wall, wherein the locking structure is configured and arranged in the press to, in operation, selectively engage a corresponding locking structure formed in a cargo load floor to lock the hinged-wall arrangement in a position with respect to a direction that the track extends.

15. The adjustable cargo storage press according to claim 12, further comprising a damper connected to the hinged wall and to a vehicle in which the press is used, wherein the damper is configured and arranged in the press to, in operation, cause the hinged wall to move in a longitudinal direction, and wherein the damper maintains a longitudinal position of the hinged wall.

16. The adjustable cargo storage press according to claim 12, further comprising a motor in communication with the hinged-wall arrangement, wherein the motor causes the hinged-wall arrangement to move in a longitudinal direction.

17. An adjustable cargo storage press comprising:
   a guide track;
   a hinged-wall arrangement in communication with the guide track, the hinged-wall arrangement comprising:

a hinged wall; and a hinge attached to the hinged wall, wherein the hinge allows the hinged wall to pivot between a horizontal position and a vertical position; and a damper connected to the hinged wall;

wherein:

the damper is configured and arranged in the press to, in operation, cause, automatically, under power of the damper, the hinged wall to move in a longitudinal direction;

the damper is configured and arranged in the press to, in operation, maintain a longitudinal position of the hinged wall; and the press is configured so that, in operation, the hinged-wall arrangement moves along the guide track to compress, when the hinged wall is in the vertical position, a cargo item between the hinged-wall arrangement and another structure.

18. The adjustable cargo storage press of claim 17, wherein the damper includes a gas spring and rod.

19. The adjustable cargo storage press of claim 17, wherein:
the damper has two connection points;
the damper is connected to the hinged wall at a first of the two connection points; and
the damper is connected, at a second of the two connection points, directly to an anchor point of a vehicle in which the press is used.

20. The adjustable cargo storage press of claim 17, wherein:
the hinged-wall arrangement is a first hinged-wall arrangement, the hinged wall is a first hinged wall, and the hinge is a first hinge;
the other structure includes a second hinged-wall arrangement in communication with the guide track, the second hinged-wall arrangement comprising:
a second hinged wall; and
a second hinge attached to the second hinged wall, wherein the second hinge allows the second hinged wall to pivot between a horizontal position and a vertical position;
the damper has two connection points;
the damper is connected to the first hinged wall at a first of the two connection points; and
the damper is connected to the second hinged wall at a second of the two connection points.

21. The adjustable cargo storage press of claim 17, wherein:
the damper is configured and arranged in the press to cause automatically the hinged wall to move in a longitudinal direction in response to release of a latch; and
the latch, when released, releases the hinged wall from a temporary locked position.

* * * * *